F. B. CARLISLE.
CASING FOR PNEUMATIC TIRES.
APPLICATION FILED AUG. 2, 1919.
1,345,997.
Patented July 6, 1920.
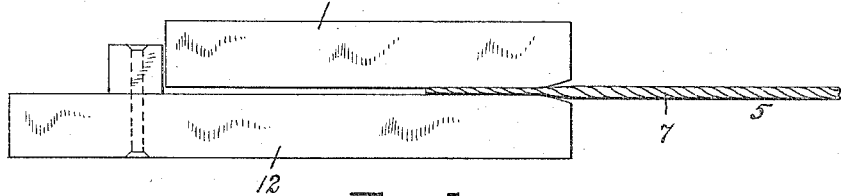
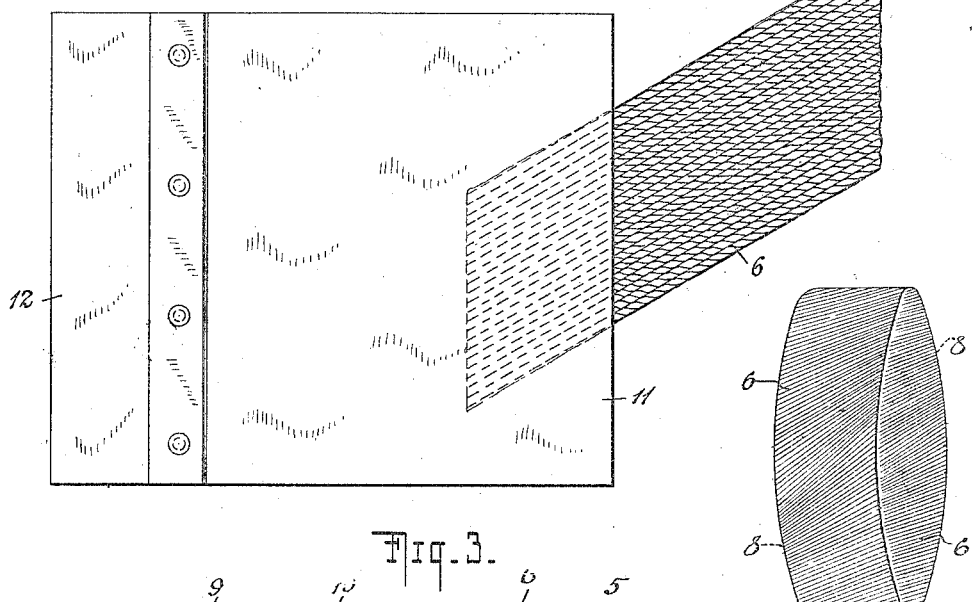
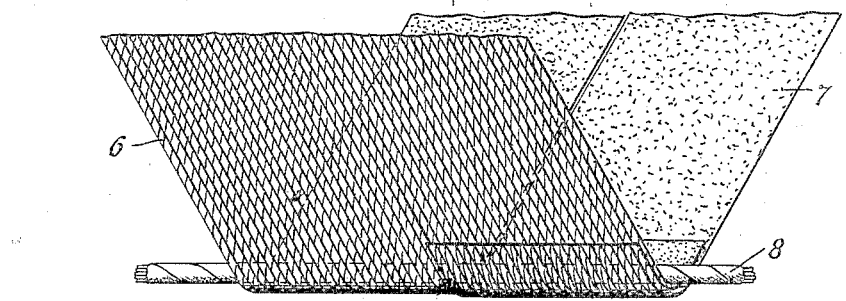
WITNESSES
INVENTOR
Fred B. Carlisle
BY
ATTORNEYS

UNITED STATES PATENT OFFICE.

FRED B. CARLISLE, OF ANDOVER, MASSACHUSETTS, ASSIGNOR TO JOSEPH M. GILBERT, OF NEW YORK, N. Y.

CASING FOR PNEUMATIC TIRES.

1,345,997.

Specification of Letters Patent.

Patented July 6, 1920.

Application filed August 2, 1919. Serial No. 314,930.

*To all whom it may concern:*

Be it known that I, FRED B. CARLISLE, a citizen of the United States, and a resident of Andover, county of Essex, State of Massachusetts, have invented a certain new and useful Improvement in Casings for Pneumatic Tires, of which the following is a specification.

My invention relates to casings for pneumatic tires and more particularly to that type thereof which have become known as cord tires and which include cord plies as part of their construction. The object of my invention is to provide an improved splice at the ends of the cord plies whereby a maximum resistance against separation or opening of the plies at said splice is established and whereby the thickness of the plies at the splice is caused to conform substantially to that of the rest of said plies. My invention will be fully described hereinafter and the features of novelty will be pointed out in the appended claims.

For the purpose of illustrating the invention, I have shown the plies as comprising composite bands composed of a foundation of sheet rubber and a plurality of parallel, adjacent cords carried adhesively upon a surface thereof, said cords preferably being impregnated, coated or otherwise treated with rubber or a rubber composition. It will be understood that my invention, although particularly adapted to be applied to composite bands constructed as set forth, may be efficiently utilized in connection with cord plies constructed otherwise than as suggested. In the accompanying drawings, Figures 1 and 2 are side and plan views respectively illustrating diagrammatically the treatment of the cord plies to produce a splice according to my invention; Fig. 3 is an edge view of the cord ply; Fig. 4 is a perspective view diagrammatically illustrating the completed splice; and Fig. 5 is a diagrammatic view of the carcass.

As shown in the drawings, the plies comprise composite bands 5 which consist of a group of parallel, adjacent cords 6 carried adhesively upon one surface of a foundation 7 of sheet rubber in the form of strips having a width corresponding approximately to the combined width of the group of cords 6. These composite bands 5 are spirally wound around and between annular members or rings 8 and completely cover the latter with cord plies to form a carcass as shown diagrammatically in Fig 5 and which represents the foundation from which the completed casing is constructed. In the illustrated example the ends of the composite band overlap to form a splice, which in the absence of any provision to avoid the same, would increase the thickness of the plies twofold at the splice and thus would destroy the uniformity of the carcass as to thickness and evenness with the result that harmful strains and stresses would be developed in the finished casing during use. As a result the life and usefulness of the casing would be materially curtailed and its efficiency from a structural standpoint would be greatly reduced.

To overcome these disadvantages the cords 6 are reduced in thickness by pressure at the opposite ends of the band 5 as indicated at 9, the compression in some cases being in two stages to produce the step shaped ends illustrated at 9 and 10 in Fig. 3; it will, of course, be understood that a single compression such as 9 will, generally speaking, be preferred.

The pressure may be applied in any convenient manner as by placing the ends of the bands 5 between suitable dies 11 and 12 operated in any suitable manner by means of any well known type of hydraulic or other press. The degree of pressure will be adapted to the reduction in thickness which is desired, a pressure of approximately 5000 pounds per square inch having, in practice, been found satisfactory to produce the portion 9 while a pressure of approximately 2500 pounds has satisfactorily produced the portions 10 if the step shaped arrangement is used. As shown in Fig. 4 the flattened ends of the band 5 overlap each other to form a splice, the arrangement preferably being such that the overlap takes place in registry with one of the annular members 8 and forms a splice which is of approximately the same thickness as the remainder of the band. The uniformity of surface is thus substantially maintained in the carcass, such slight differences between the splice and the remainder of the band as may occur being compensated for in any convenient manner, as for instance by laying suitable strips of fabric over the edges of the carcass, between, but not over the splices as indicated diagrammatically in Fig. 5.

By constructing the band as described and by overlapping the same in the manner indicated, a splice is secured whereby a maximum of resistance against separation or opening of the cord plies at the splice is established. In other words, the splice is as strong as any other part of the band and develops no weakness whereby the efficiency and life of the casing may be injuriously affected.

Various changes in the specific form shown and described may be made within the scope of the claims without departing from the spirit of my invention.

I claim:

1. In a casing for pneumatic tires the combination of a pair of annular members and a plurality of parallel, adjacent cords constituting a band extending between and about said annular members in helical windings and having its ends overlapping to form a splice, at least one of said ends being flattened at said splice.

2. In a casing for pneumatic tires the combination of a pair of annular members and a composite band comprising a rubber sheet carrying adhesively upon its surface a group of parallel adjacent cords, said band being helically wound around and between said annular members and having its ends overlapping to form a splice, cords at said ends being flattened to compensate for the double thickness of the splice.

3. A band of material for use in constructing tires and including a plurality of parallel, adjacent cords having at least one end flattened and adapted to overlap the other end.

4. A band of material for use in constructing tires and comprising a rubber sheet and a group of parallel, adjacent cords adhesively carried by said rubber sheet upon its one surface, the ends of said cords being flattened and adapted to overlap each other.

In testimony whereof I have hereunto set my hand.

FRED B. CARLISLE.